US010761291B2

(12) United States Patent
Kuo et al.

(10) Patent No.: US 10,761,291 B2
(45) Date of Patent: Sep. 1, 2020

(54) LENS DRIVING MECHANISM (71) Applicant: TDK TAIWAN CORP., Yangmei Taoyuan (TW)

(72) Inventors: Chen-Chi Kuo, Yangmei Taoyuan (TW); Chao-Chang Hu, Yangmei Taoyuan (TW); Sin-Jhong Song, Yangmei Taoyuan (TW)

(73) Assignee: TDK TAIWAN CORP., Yangmei Taoyuan (TW)

(*) Notice: Subject to any disclaimer, the term of this patent is extended or adjusted under 35 U.S.C. 154(b) by 316 days.

(21) Appl. No.: 15/702,045

(22) Filed: Sep. 12, 2017

(65) Prior Publication Data
US 2018/0136433 A1 May 17, 2018

Related U.S. Application Data (60) Provisional application No. 62/421,576, filed on Nov. 14, 2016.

(30) Foreign Application Priority Data

Aug. 14, 2017 (CN) .......................... 2017 1 0692829

(51) Int. Cl.
G02B 7/04 (2006.01)
G02B 13/00 (2006.01)
(Continued)

(52) U.S. Cl.
CPC ............ G02B 7/04 (2013.01); G02B 13/0015 (2013.01); G03B 3/10 (2013.01); G03B 5/06 (2013.01);
(Continued)

(58) Field of Classification Search
CPC ........ G02B 7/102; G02B 7/10; G02B 13/009; G02B 15/14; G02B 15/173; G02B 15/177; G02B 7/08; G02B 7/04; G02B 27/646; G02B 3/14; G02B 5/005; G02B 13/0065; G02B 15/00; G02B 15/16; G02B 7/023; G02B 13/0045; G02B 13/0075;
(Continued)

(56) References Cited

U.S. PATENT DOCUMENTS

2008/0247748 A1* 10/2008 Tanimura ................. G03B 3/10
396/502
2014/0368915 A1* 12/2014 Hu ......................... G02B 27/646
359/557

(Continued)

Primary Examiner — William R Alexander
Assistant Examiner — Sharrief I Broome
(74) Attorney, Agent, or Firm — Muncy, Geissler, Olds & Lowe, P.C.

(57) ABSTRACT

A lens driving mechanism is provided, configured to drive an optical lens, including a bottom plate, a movable portion, an elastic member, and a biasing assembly. The movable portion is disposed on the bottom plate and has a base and a holder, wherein the holder is configured to hold the optical lens, and the holder is movably connected to the base. The elastic member connects the movable portion to the bottom plate. The biasing assembly connects the bottom plate and the movable portion and is configured to force the movable portion to move relative to the bottom plate. When the holder moves to a lower-limit position relative to the base, the holder comes into contact with the elastic member.

14 Claims, 11 Drawing Sheets (51) Int. Cl.
*G03B 3/10* (2006.01)
*H04N 5/232* (2006.01)
*G03B 29/00* (2006.01)
*G03B 5/06* (2006.01)
*H04N 5/225* (2006.01)
*G02B 27/64* (2006.01)

(52) U.S. Cl.
CPC ........... *G03B 29/00* (2013.01); *H04N 5/2254* (2013.01); *H04N 5/2328* (2013.01); *H04N 5/23287* (2013.01); *G02B 27/646* (2013.01); *G03B 2205/0015* (2013.01); *G03B 2205/0069* (2013.01)

(58) Field of Classification Search
CPC ...... G02B 15/142; G02B 15/22; G02B 7/021; G03B 3/10; G03B 17/04; G03B 2205/0046; G03B 13/36; G03B 17/00; G03B 17/17; G03B 2205/0007; G03B 2205/0084; G03B 17/14; G03B 2205/0092; G03B 5/00; G03B 5/02; G03B 13/34; G03B 17/08; G03B 17/12; G03B 17/38; G03B 19/02; G03B 21/142; G03B 21/53; G03B 2217/002; H04N 5/23296; H04N 5/2254; H04N 5/23212; H04N 5/232; H04N 13/239; H04N 13/296; H04N 1/00397; H04N 1/00496; H04N 1/195; H04N 1/19594; H04N 2201/0436; H04N 2213/001; H04N 5/2251; H04N 5/2252; H04N 5/2256; H04N 5/2258; H04N 5/2259; H04N 5/23203; H04N 5/23209; H04N 5/23229
See application file for complete search history.

(56) References Cited

U.S. PATENT DOCUMENTS

| | | | |
|---|---|---|---|
| 2016/0025995 A1* | 1/2016 | Ariji | G02B 7/08 359/557 |
| 2017/0192195 A1* | 7/2017 | Murakami | G02B 7/04 |
| 2018/0113322 A1* | 4/2018 | Sugawara | G02B 7/09 |
| 2018/0120532 A1* | 5/2018 | Murakami | G02B 7/04 |

* cited by examiner

LENS DRIVING MECHANISM

CROSS REFERENCE TO RELATED APPLICATIONS

This application claims the benefit of U.S. Provisional Application No. 62/421,576, filed on Nov. 14, 2016, and China Patent Application No. 201710692829.6 filed on Aug. 14, 2017 the entirety of which is incorporated by reference herein.

BACKGROUND OF THE INVENTION

Field of the Invention

The application relates in general to a lens driving mechanism, and in particular to a lens driving mechanism that includes an elastic member and a frame configured to restrict the movement of the holder and the optical lens disposed therein.

Description of the Related Art

Thanks to ongoing technological development, the most recent electronic devices (such as tablet computers and smartphones) being put on the market are increasingly trending toward miniaturization, and they usually include a lens module capable of aiding in photography or recording video. The demands on these increasingly indispensable electronic devices are also rapidly growing. However, an image may come out blurry if the user shakes the lens module in the electronic device. To miniaturize the electronic device and improve image quality, it is increasingly important to design a smaller and effectively shockproof lens module.

BRIEF SUMMARY OF INVENTION

To address the deficiencies of conventional products, an embodiment of the invention provides a lens driving mechanism configured to drive an optical lens, including a bottom plate, a movable portion, an elastic member, and a biasing assembly. The movable portion is disposed on the bottom plate and has a base and a holder, wherein the holder is configured to hold the optical lens and movably connects to the base. The elastic member connects the movable portion to the bottom plate. The biasing assembly connects the bottom plate to the movable portion and is configured to force the movable portion to move relative to the bottom plate. When the holder moves to a lower-limit position relative to the base, the holder is in contact with the elastic member.

In some embodiments, the lens driving mechanism further comprises a housing connecting to and disposed on the bottom plate, and the movable portion is disposed in the housing, wherein when the movable portion moves to an upper-limit position relative to the base, the holder is in contact with the housing.

In some embodiments, the movable portion further includes a frame disposed on the base, and the frame does not overlap with the holder in the direction of the optical axis of the optical lens.

In some embodiments, when the holder moves to the upper-limit position, the holder protrudes from the frame.

In some embodiments, when the holder moves along the direction of the optical axis in the housing, the holder is not in contact with the base and the frame.

In some embodiments, the frame includes a permeable material.

In some embodiments, the movable portion further includes an electromagnetic driving assembly disposed on the frame and the holder and configured to force the holder to move relative to the base, and the electromagnetic driving assembly has at least one magnetic element disposed on the frame, wherein the frame exposes the magnetic element in the direction of the optical axis.

In some embodiments, the movable portion further includes a first leaf spring having a bending structure and connecting the holder and the frame, and the frame exposes the bending structure in the direction of the optical axis.

In some embodiments, the base has a first engaging portion, the elastic member has a second engaging portion, and the first and second engaging portions engage with each other.

In some embodiments, when the holder moves to the lower-limit position, the holder protrudes from the lower surface of the base.

In some embodiments, the elastic member has an opening with a flange structure extending toward the base.

In some embodiments, in the direction perpendicular to the optical axis of the optical lens, the flange structure of the elastic member and the holder are overlapping.

In some embodiments, the bottom plate has a flange structure passing through the elastic member.

In some embodiments, in the direction perpendicular to the optical axis of the optical lens, the flange structure of the bottom plate and the holder are overlapping.

In some embodiments, the biasing assembly includes shape-memory alloy (SMA) material.

In some embodiments, the biasing assembly forces the movable portion to move along the optical axis of the optical lens or forces the movable portion to rotate around the optical axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lens driving mechanisms are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
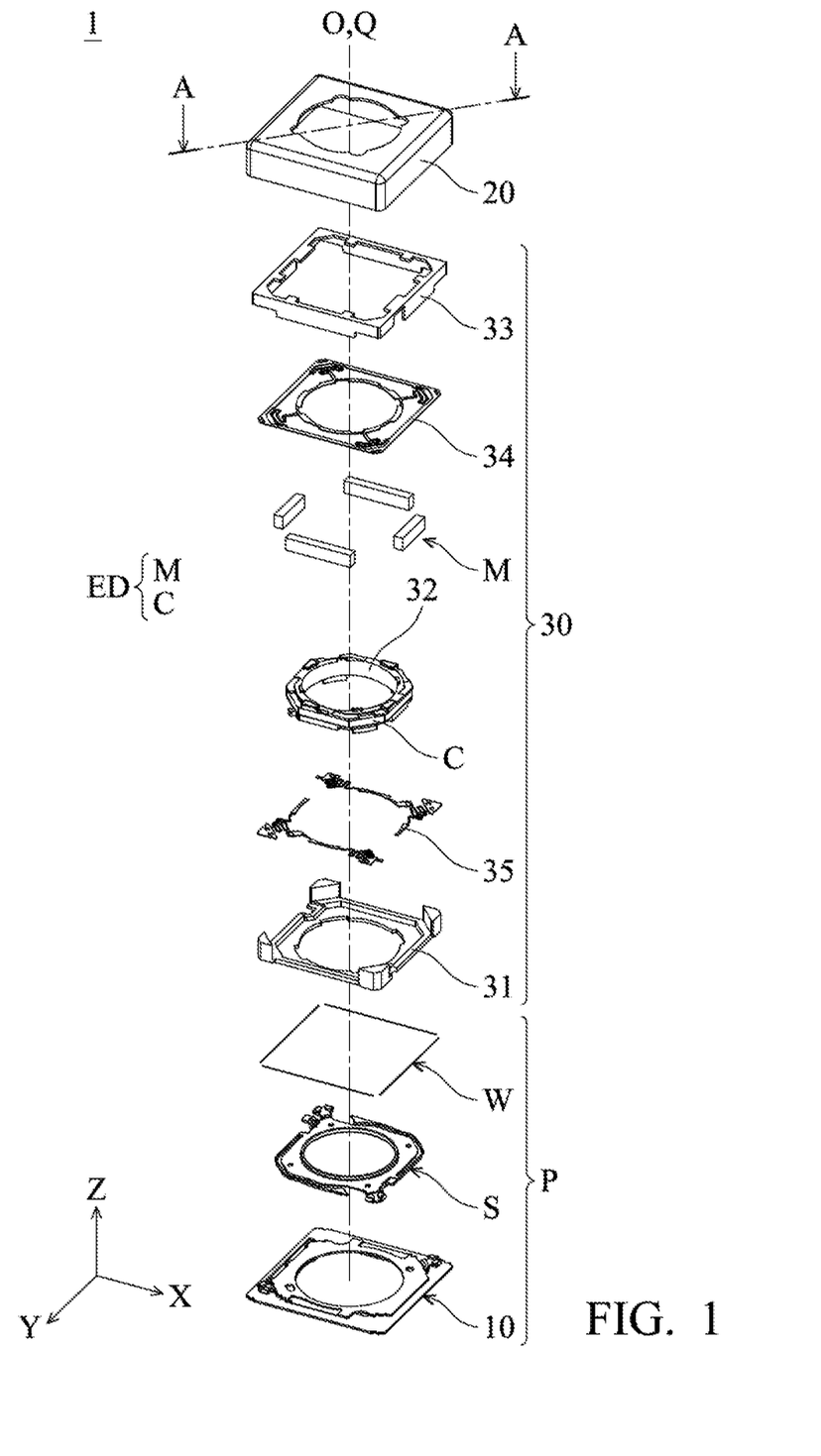
FIG. 1 is an exploded diagram of a lens driving mechanism according to an embodiment of the invention.

FIG. 1 is an exploded-view diagram of a lens driving mechanism 1 according to an embodiment of the invention. The lens driving mechanism 1 can be disposed in an electronic device, such as a camera, a tablet computer, or a cell phone, and it can sustain an optical lens (not shown) and force the optical lens to move relative to an image sensor disposed the electronic device, so that the lens driving mechanism 1 has functions of auto-focusing (AF) function and optical image stabilization (OIS), to enhance image quality.

Figure 2:
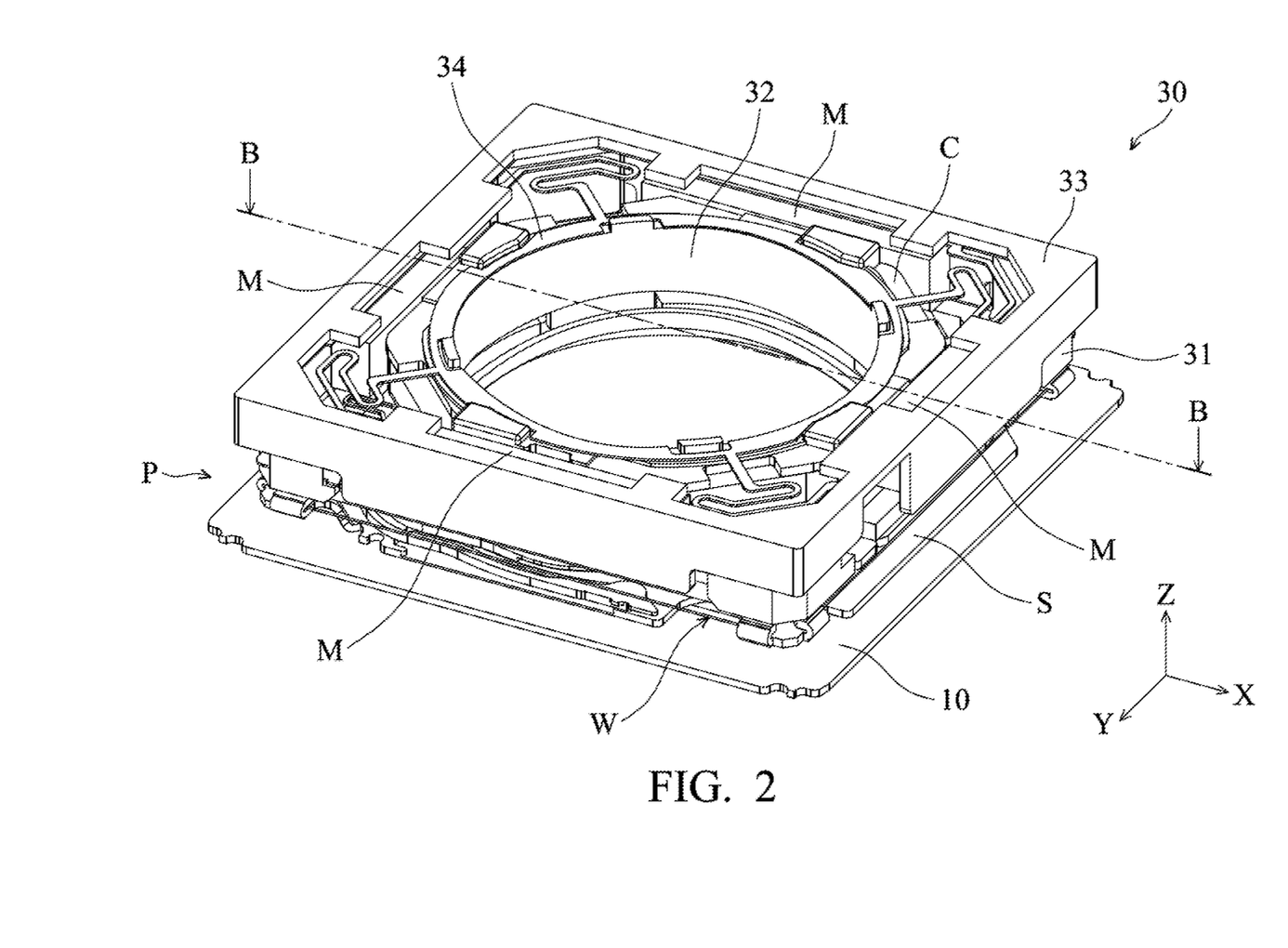
FIG. 2 is a schematic diagram of the lens driving mechanism in FIG. 1 after assembly (the housing 20 is omitted).

As shown in FIGS. 1 and 2, the lens driving mechanism 1 primarily comprises a housing 20, a movable portion 30, and a first part P, wherein the first part P includes a bottom plate 10, a biasing assembly W, and an elastic member S. The housing 20 is connected to and disposed on the bottom plate 10. The movable portion 30, the biasing assembly W, and the elastic member S are disposed on the bottom plate 10 and situated in the housing 20 configured to protect them. The movable portion 30 can sustain an optical lens, wherein an image sensor is configured to receive light from the outside of the electronic device and through the optical lens so that an image is acquired. The detailed structure of the movable portion 30 is described below, and the connection between the movable portion 30 and the bottom plate 10 will be described later.

Figure 3:
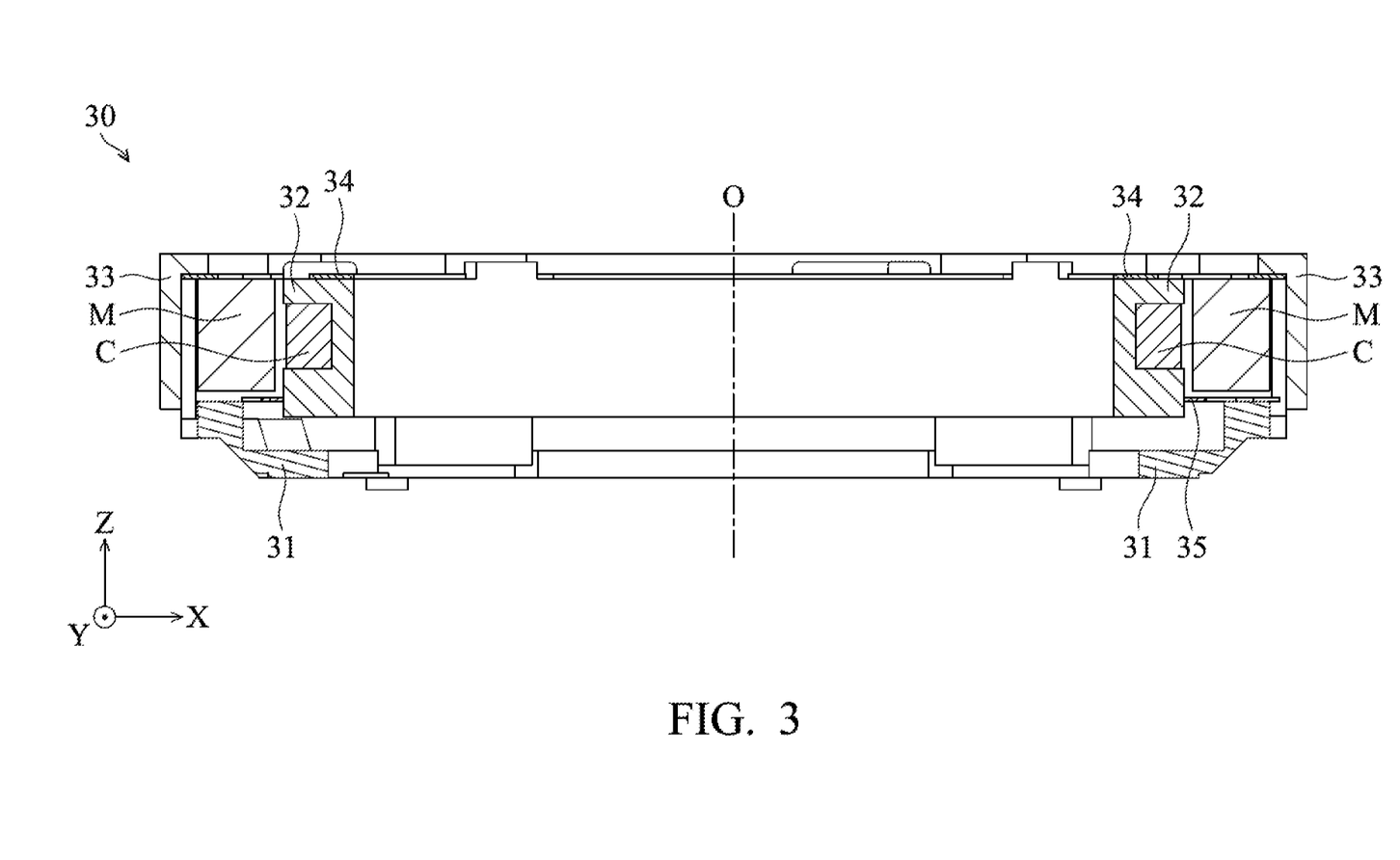
FIG. 3 is a sectional view diagram of the movable portion taken along line B-B in FIG. 2.

Please refer to FIGS. 1 to 3, wherein FIG. 3 is a sectional view diagram of the movable portion 30 in FIG. 2. The movable portion 30 includes a base 31, a holder 32, a frame 33, an electromagnetic driving assembly ED, a first leaf spring 34, and a second leaf spring 35. The holder 32 is configured to hold an optical lens and disposed on the base 31, and the frame 33 is disposed on the holder 32. The first and second leaf springs 34 and 35 connect the holder 32 to the base 31 and the holder 32 is sandwiched therebetween. The electromagnetic driving assembly ED includes a coil C and a plurality of magnetic elements M (such as magnets) which are respectively disposed on the holder 32 and the frame 33. More specifically, the coil C is disposed around the holder 32, and four magnetic elements M are connected to the frame 33 via the upper surface thereof and correspond to the coil C.

Figure 4:
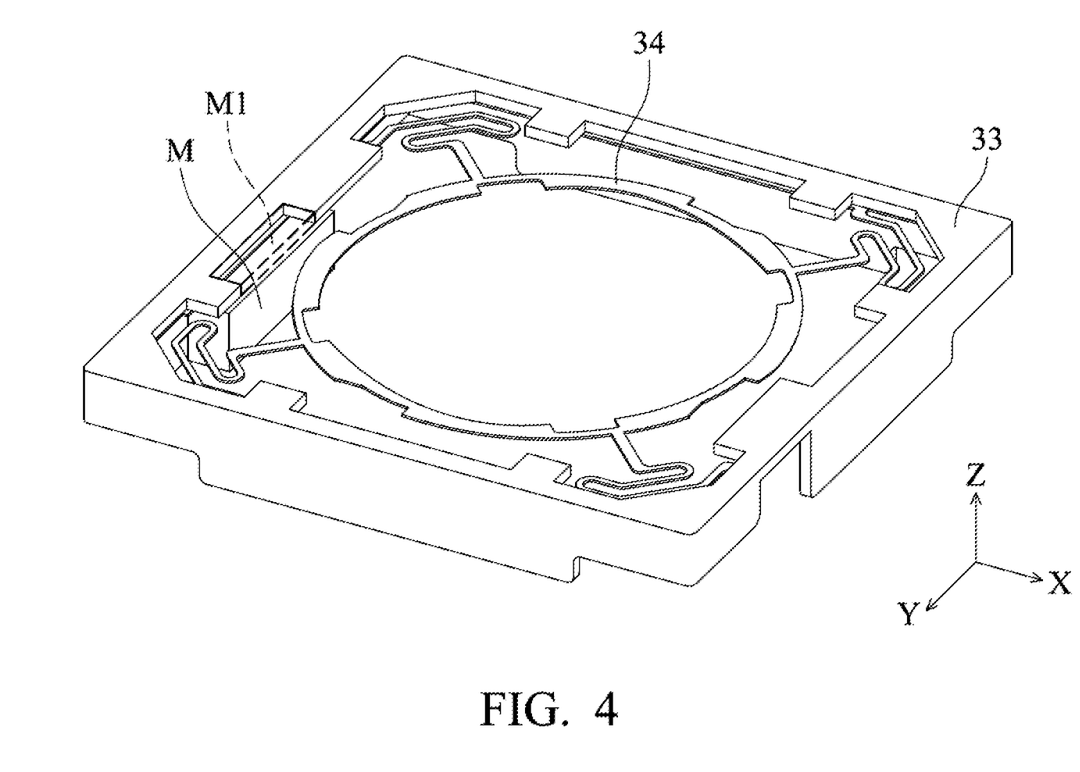
FIG. 4 is a schematic diagram of the frame assembled with one magnetic element and the first leaf spring.

It should be noted that the connection of the magnetic elements M and the frame 33 may be accomplished by applying a glue (for example, a transparent glue). Specifically, as shown in FIG. 4, when the magnetic element M is provided on the frame 33, the frame 33 exposes at least a portion of the upper surface of the magnetic element M viewed from the direction of the optical axis O of the optical lens. A glue M1 can be applied directly to the upper surface of the magnetic element M from above, so that the magnetic element M is connected to the frame 33. Therefore, since the frame 33 exposes a portion of the magnetic element M, the glue M1 can be directly applied from above. Compared to a traditional connection mechanism which the magnetic element M is adhered by the inner sidewall of the frame 33 or applying the glue M1 to the magnetic element M from below, the present embodiment has the effect of simplifying the assembling step and avoiding or preventing the glue M1 from flowing downwardly along the sidewall of the frame 33. In some embodiments, the glue M1 may fully cover the upper surface of the magnetic element M exposed by the frame 33 or partially applied to the exposed upper surface of the magnetic element M. In addition, the first leaf spring 34 provided between the magnetic element M and the frame 33 may be adhered to the frame 33 together to simplify the assembling process.

In the present embodiment, the coil C may receive one or more driving signals (such as electrical current) applied by an external power source (not shown), so that a magnetic force or forces can be provided between the coil and the magnetic elements M so as the electromagnetic driving assembly ED can force the holder 32 and the optical lens disposed therein to mover together with respect to the base 31 along the optical axis O (Z-axis), to achieve auto-focusing, or when the optical lens is shaken, the aforementioned movement compensates, in order to achieve the purpose of an anti-shake function. Furthermore, before applying the driving signal, the holder 32 can be positioned at an initial position with respect to the base 31 by the first and second leaf springs 34 and 35. In addition, the frame 33, configured to connect the magnetic elements M, may have a permeable material, or a plurality of elements with permeable materials may be embedded in the sidewalls of the frame 33 which face the magnetic elements M, to enhance the mechanical strength of the frame 33, and the magnetic force of the magnetic element M can be concentrated in a predetermined direction to enhance the magnetic force for forcing/driving the holder 32 to move.

Figure 5:
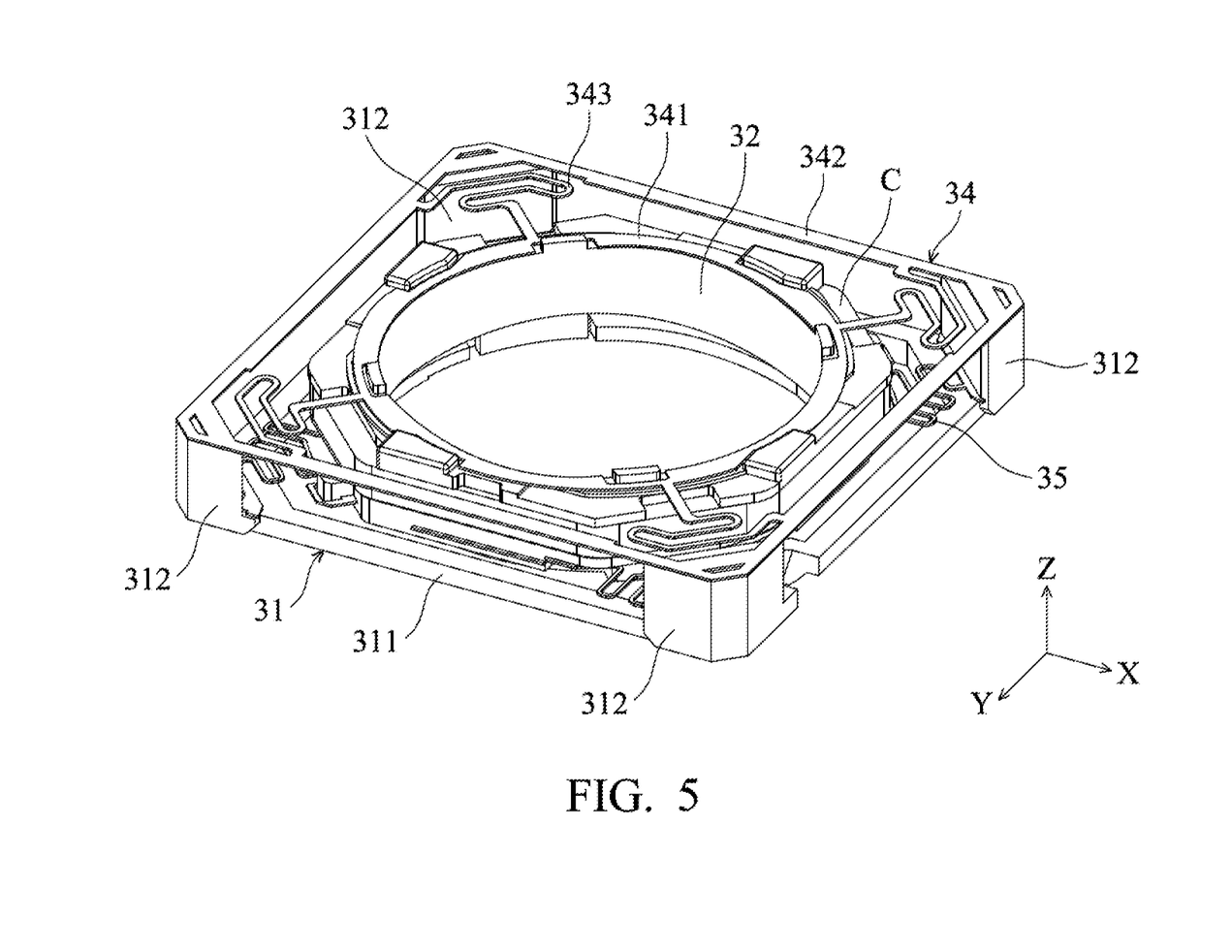
FIG. 5 is a schematic diagram of the first and second leaf springs connecting the holder to the base.

FIG. 5 is a schematic diagram of the holder 32 connecting to the base 31 via the first and second leaf springs 34 and 35. The base 31 has four protrusions (such as protruding columns) 312 respectively disposed on four corners of the main body 311 of the base 31. The first and second leaf springs 34 and 35 connect the protrusions 312 and the holder 32, so that the holder 32 is movably connected to the base 31. It should be noted that the first leaf spring 34 has an inner string structure 341, an outer string structure 342, and a bending structure 343. The outer string structure 342 has a substantially rectangular structure and is disposed on the protrusions 312, and the inner string structure 341 has a substantially circular structure and disposed on the holder 32. The bending structure 343 connects the inner and outer string structures 341 and 342.

Figure 6:
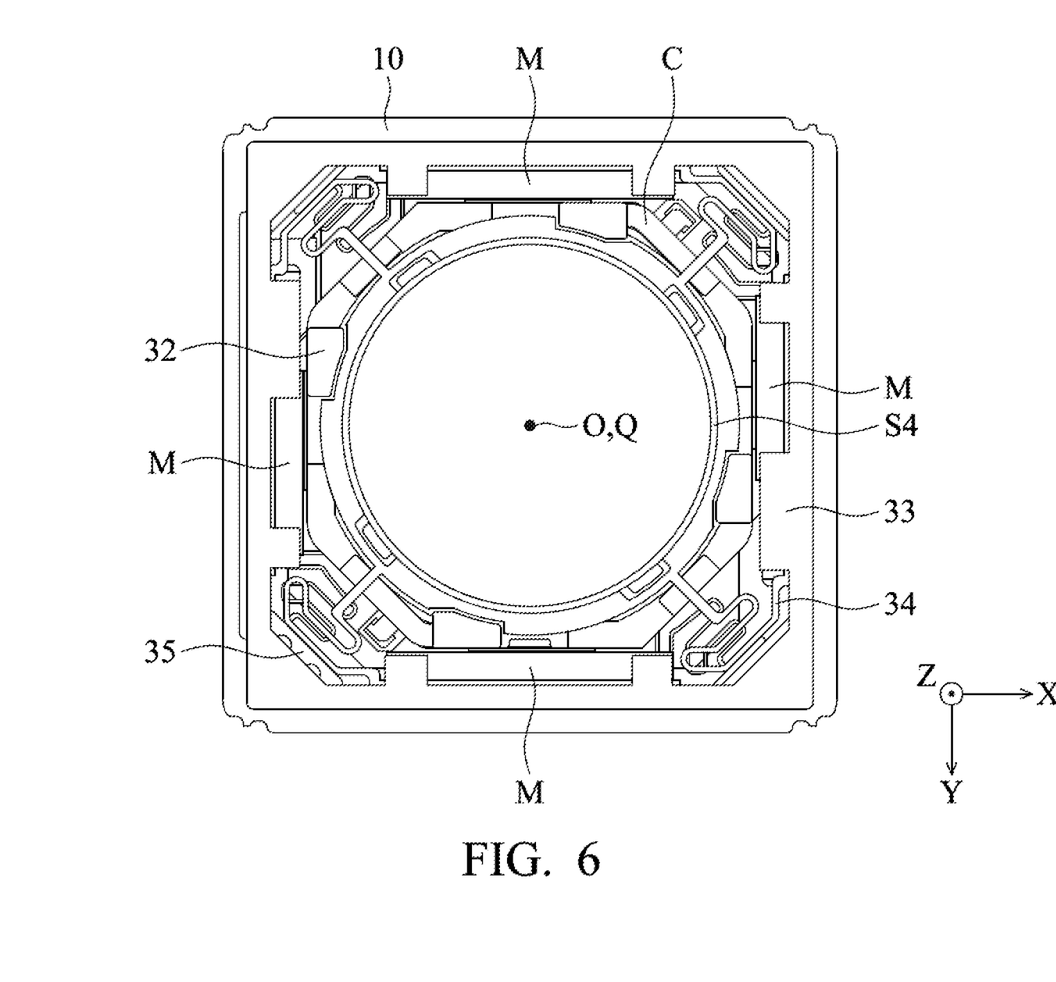
FIG. 6 is a top plan view diagram of the lens driving mechanism in FIG. 2.

It is noted that the frame 33 exposes the holder 32 and the bending structure 343 of the first leaf spring 34 (the bending structure 343 is exposed) when viewed from the direction of the optical axis O, as shown in FIG. 6. Moreover, the frame 33 does not overlap with the holder 32 in the direction of the optical axis O.

Next, the movement of the holder 32 of the movable portion 30 is described in detail below.

Figure 7:
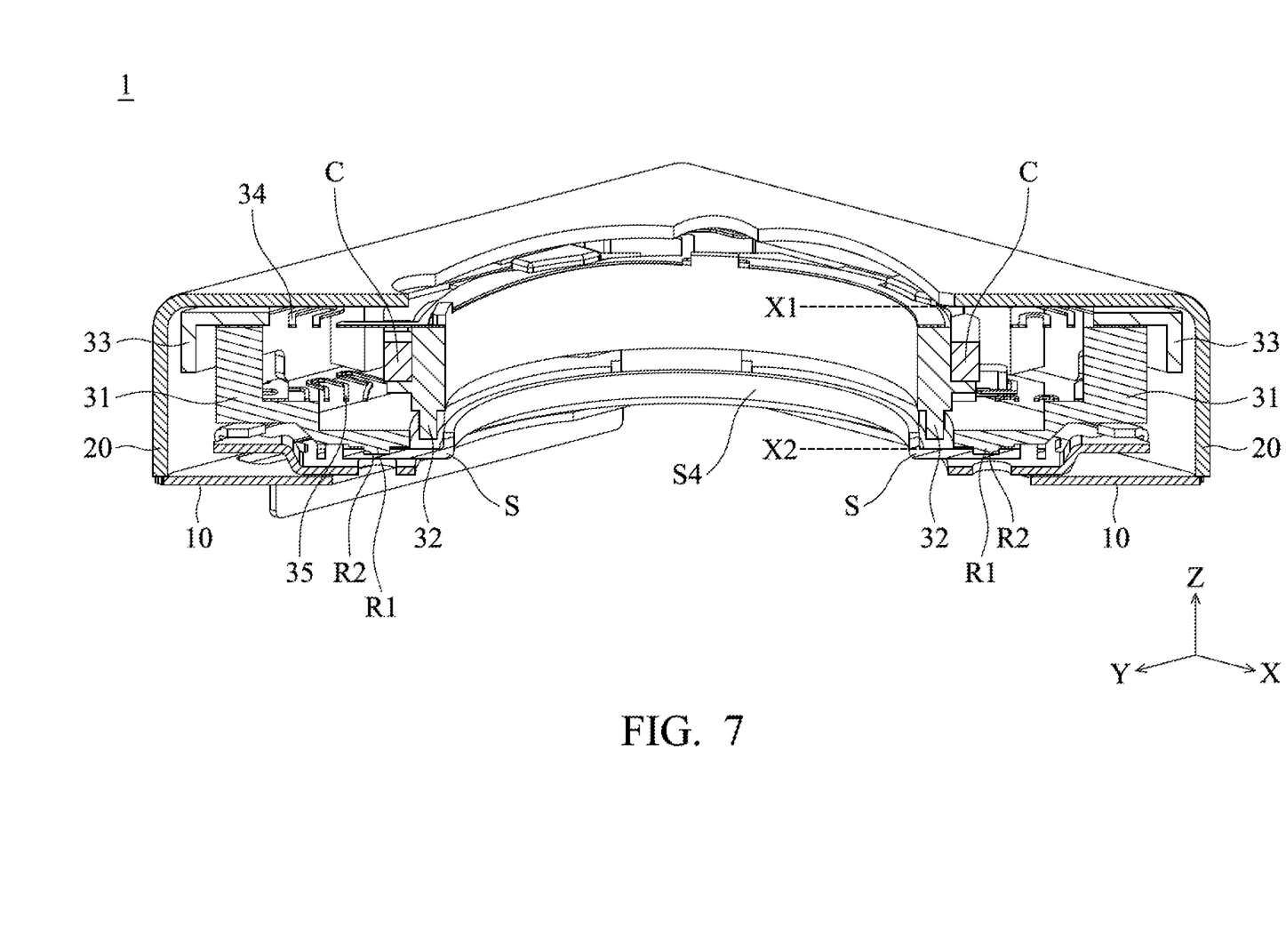
FIGS. 7-8 are sectional view diagrams of the lens driving mechanism in FIG. 1 after assembly taken along line A-A (these two diagrams are different views).
Figure 8:
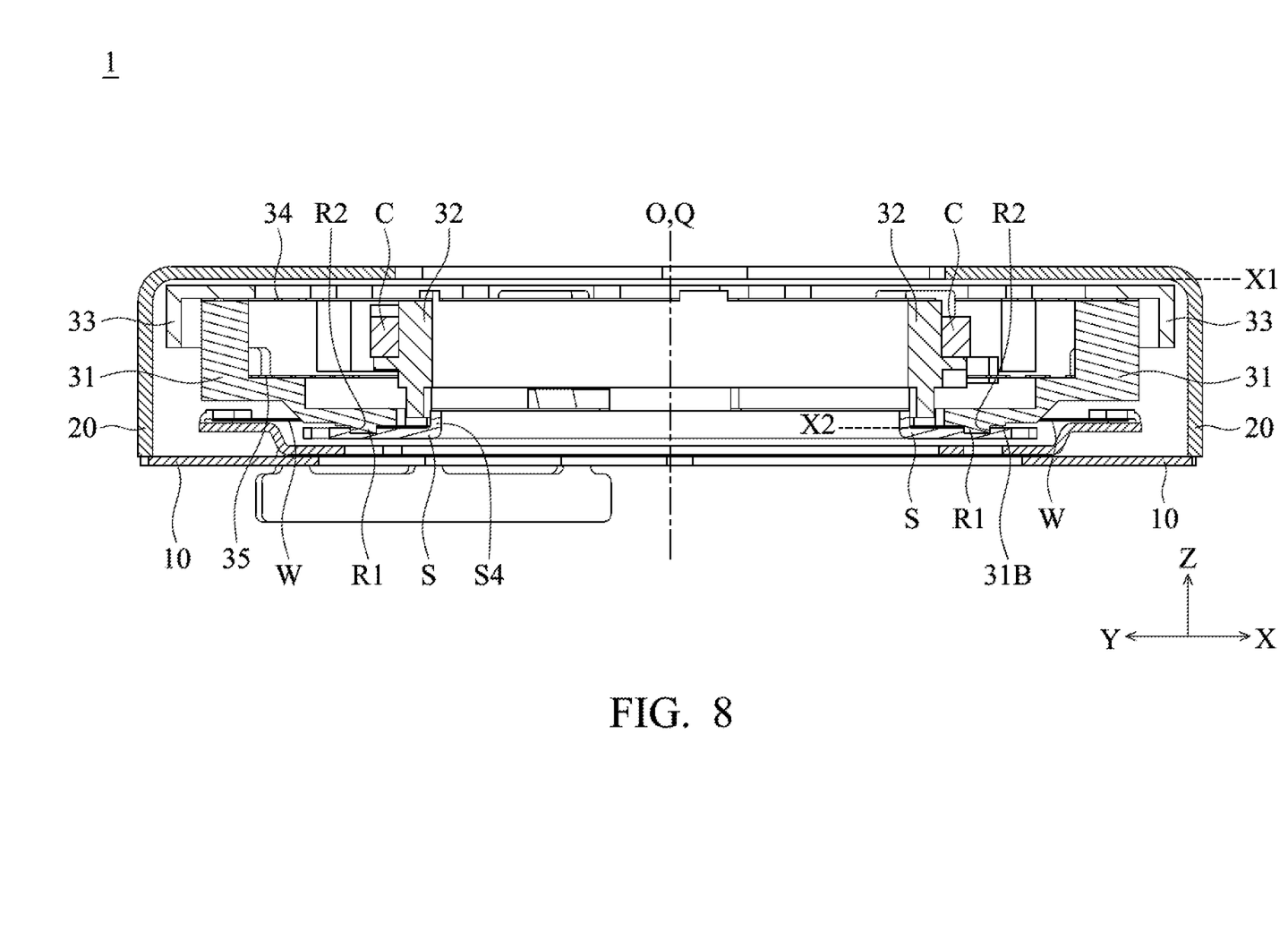

Please refer to FIGS. 7-8, when the electromagnetic driving assembly ED forces the holder 32 (the optical lens disposed therein) to move upward relative to the base 31 and the frame 33 along the optical axis O, the holder 32 can protrude from (be higher than) the frame 33, and the holder 32 is restricted/limited by the housing 20 at an upper-limit position (or extreme position) X1 (the holder 32 is restricted when it moves upward to touch/contact the housing 20)

Similarly, when the electromagnetic driving assembly ED forces the holder 32 (the optical lens disposed therein) to move downward relative to the base 31 and the frame 33, the holder 32 protrudes from the lower surface 31B of the base 31, and the holder 32 is restricted by the elastic member S at an lower-limit position X2 (the holder 32 is restricted when it moves downward to pass through the base 31 and to touch/contact the elastic member S). Therefore, compared to a transitional position-limiting mechanism which the holder is limited by the frame and the base, in the present embodiment, instead of the inner frame 33 and the base 31 servicing as a stopping mechanism (the holder 32 does not touch or contact the frame 33 and the base 31), the housing 20 and the elastic member S are configured to limit the holder 32. Therefore, the distance of movement of the holder 32 in the housing 20 (along the direction of the optical axis O) is effectively increased so that the auto-focusing and optical image stabilization of the optical drive mechanism 1 are improved, and it is possible to save the thickness of the holder 32 and base 31 and the frame 33 in the direction of the optical axis O (due to no longer serving the stopping mechanism), thereby achieving the purpose of miniaturization.

In some embodiments, the lower surface 31B of the base 31 may abut on the elastic member S. When the holder 32 moves to the lower-limit position X2, the holder 32 is in contact with the elastic member S and aligned and parallel to the lower surface 31B.

Furthermore, as shown in FIG. 8, a plurality of first engaging portions R1 are formed on the lower surface 31B of the base 31, and the elastic member S has a plurality of second engaging portions R2, wherein the first and second engaging portions R1 and R2 match each other. Thus, when the base 31 is attached to the elastic member S, the first and second engaging portions R1 and R2 serve as a positioning mechanism which can improve the assembly accuracy, and the contact area between them is increased to enhance the connection strength. Moreover, the first and second engaging portions R1 and R2 may be provided with a groove configured to receive the glue, so that the glue does not easily flow out to the other components. In the present embodiment, the first engaging portion R1 is a protruding structure, and the second engaging portion R2 is a recessed structure; in another embodiment, the first and second engaging portions R1 and R2 are recessed and protruding structures, respectively.

Next, the connection of the movable portion 30 and the bottom plate 10 is described in detail below.

Figure 9:
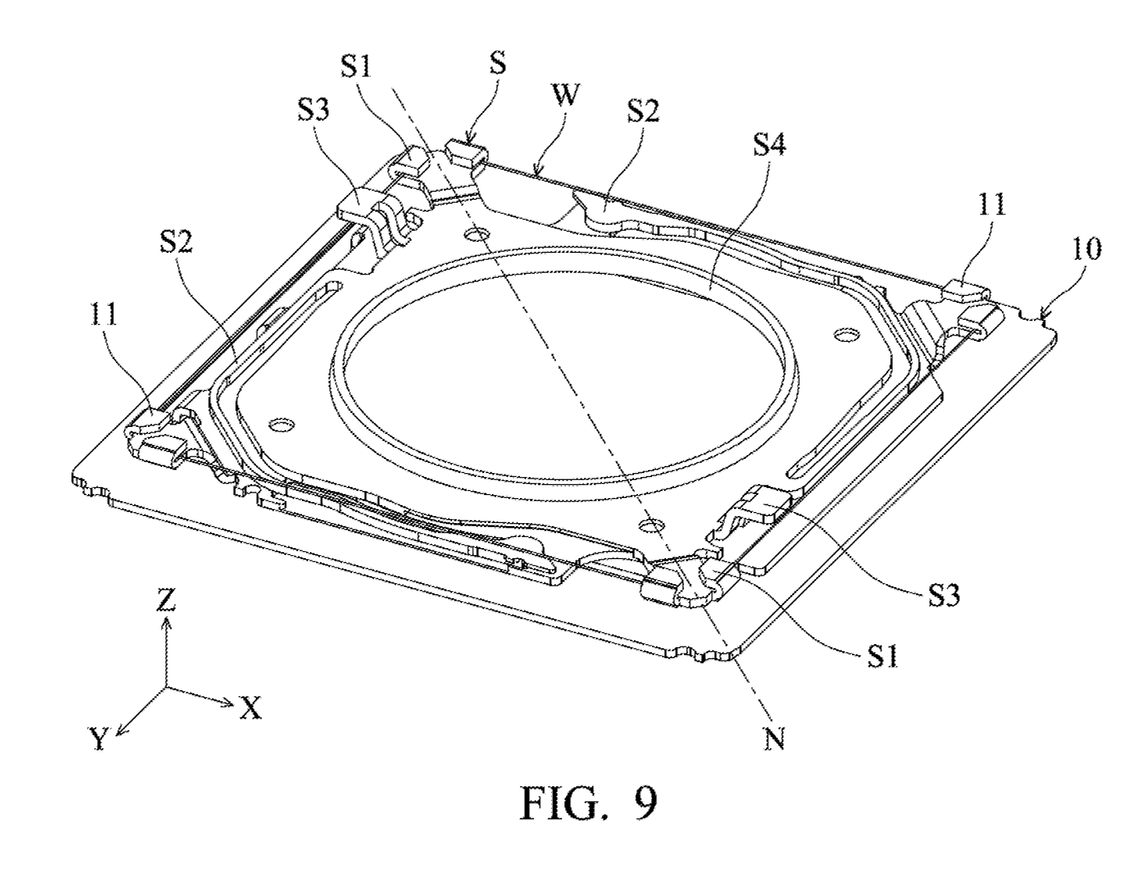
FIG. 9 is a schematic diagram of connection of the bottom plate, the elastic member and the biasing assembly.

Please refer to FIGS. 2, 8 and 9, the bottom plate 10 has a central axis Q, wherein the optical axis O coincides with the central axis Q when the optical lens (disposed in the movable portion 30) when at the initial position. The bottom plate 10, which may be a flexible printed circuit board (FPCB), for example, is disposed under the movable portion 30, and the elastic member S and the biasing assembly W are disposed between the bottom plate 10 and the base 31 (of the movable portion 30). The bottom plate 10 and the base 31 are connected each other by the biasing assembly W and the elastic member S.

More specifically, as shown in FIGS. 2, 8, and 9, the biasing assembly W has four elongated biasing wires that correspond to the four sides of the bottom plate 10 having a substantially rectangular structure. The two ends of each biasing wire are respectively connected to the fixed portion 11 of the bottom plate 10 and the connecting portion S1 of the elastic member S, wherein the fixed portion 11 and the connecting portion S1 extend along the direction of optical lens O (Z-axis) and extend toward the base 31. The elastic member S is disposed between the bottom plate 10 and the base 31 and connects them.

The biasing assembly W, having a plurality of biasing wires including a shape-memory alloy (SMA) material, is also connected to the bottom plate 10 and the movable portion 30, and the lengths of the biasing wires can be changed by applying driving signals (e.g., electrical current) to them from an external power source (not shown). For example, when applying one or more driving signals to heat the biasing assembly W, the biasing assembly W is able to deform (e.g., become elongated or shortened). When the application of the driving signals is stopped, the deformed biasing assembly W will recover to its original length. In other words, by applying one or more appropriate driving signals, the length of the biasing assembly W can be controlled to move the movable portion 30 (including the holder 32 and the optical lens) relative to the bottom plate 10, to alter the posture of the movable portion 30. Thus, the lens driving mechanism 1 has the function of optical-shaking compensation and optical-image stabilization.

The biasing assembly W, for example, may include a titanium-nickel (TiNi) alloy, a titanium-palladium (TiPd) alloy, a titanium-nickel-copper (TiNiCu) alloy, a titanium-nickel-palladium (TiNiPd) alloy, or a combination thereof.

Still referring to FIGS. 2 and 9, the elastic member S (such as a sheet spring) has a metal material and a substantially rectangular structure, and includes two arms S2 and two protruding portions S3 which are respectively connected to the movable portion 30 and the bottom plate 10. The elastic member S (the arms S2 and the protruding portions S3 thereof) may connect to conductive wires (not shown) which are formed on the bottom plate 10 and the base 31 of the movable portion 30 by insert molding or 3D molded interconnect device (MID) technology. Thus, those conductive wires connect to the four biasing wires via the elastic member S to form four respective independent circuits, whereby driving signals (e.g., current) can be supplied to the biasing wires (the biasing assembly W) respectively from an external power source via the conductive wires, and the lengths of the biasing wires can be changed so that the movable portion 30 can move relative to the bottom plate 10.

It should be noted that, due to the conductive wires formed on the base 10 and the bottom 20 by insert molding or 3D molded interconnect device technology, the number of components of the lens driving mechanism 1 can be reduced and the dimensions thereof can be greatly decreased.

As shown in FIG. 9, the four biasing wires of the biasing assembly W are respectively disposed on the four sides of the bottom plate 10 and corresponding to the four sides of the lower surface 31B of the base (please see FIGS. 2 and 8). Each side of the bottom plate 10 is provided with one fixed portion 11 and one connecting portion S1 which are connected via the biasing wire. Specifically, the two fixed portions 11 and the two connecting portions S1 are respectively disposed at the four corners of the bottom plate 10 and positioned in a staggered configuration (that is, any two adjacent corners are provided with one connecting portion S1 and one fixed portion 11). Furthermore, the substantially rectangular bottom plate 10 defines a diagonal line N, and the four biasing wires and the connecting portions S1 are substantially symmetrical to the diagonal line N.

In addition, the opening of the elastic member S is formed with a circular-shaped (or substantially circular-shaped) flange structure S4, extending along the central axis Q/optical axis O. As shown in FIGS. 6 and 7, the flange structure S4 is received in the holder 32 and overlaps with the holder 32 (the flange structure S4 and the holder 32 are overlapping) in a direction that is perpendicular to the optical axis O. The flange structure S4 is closer to the central axis Q/optical axis O than the holder 32. By forming the flange structure S4, it is possible to avoid or reduce the amount of external particles that enter the holder 32 and affect the optical lens, thereby greatly improving the product.

Still referring to FIGS. 2 and 9, when applying appropriate driving signals to the biasing assembly W, the biasing assembly W deforms (e.g., by being shortened or elongated) so that the movable portion 30 (and the optical lens disposed therein) are moved relative to the bottom plate 10, to achieve optical image stabilization.

Two types of motion of the movable portion 30 relative to the bottom plate 10 may be applied. The movable portion 30 may linearly move relative to the bottom plate 10 in a direction that is substantially perpendicular to the central axis Q. Alternatively, the movable portion 30 may rotate around the central axis Q. Thus, the positional and angular compensation for the movable portion 30 can be accomplished by controlling the deformation of the biasing assembly W which receives the appropriate drive signals. In addition, since the movable portion 30 and the bottom plate 10 are also connected through the elastic member S, when the drive signals have not yet been applied to the biasing assembly W, the movable portion 30 can be positioned at an initial position with respect to the bottom plate 10 by the elastic member S.

In some embodiments, the optical driving mechanism 1 may further comprise an alignment assembly (not shown) having a first alignment element and a second alignment element disposed on the bottom plate 10 and on the movable portion 30 (such as on the lower surface 31B of the base 31 thereof), respectively, which are matching each other. The first alignment element may be one of a permanent magnet and a Hall effect sensor, and the second alignment element being the other of the two. It is possible for the Hall effect sensor to detect the position of the permanent magnet by detecting the change of the magnetic field of the permanent magnet, so as to detect the positional deviation (displacement) of the movable portion 30 relative to the bottom plate 10 due to vibration.

As shown in FIG. 9, when appropriate drive signals are applied to the two biasing wires which are opposite each other in FIG. 9, thereby elongating and contracting them, respectively (the elongated biasing wire elongates toward the connecting portion 11; the contracted biasing wire contracts toward the fixed portion 11), the biasing assembly W forces the movable portion 30 (which is connected to the elastic member S) to linearly move in a direction that is perpendicular to the central axis Q with respect to the bottom plate 10. Similarly, when applying appropriate drive signals to these two biasing wires, causing both them to contract, the biasing assembly W forces the movable portion 30 to rotate around the central axis Q relative to the bottom plate 10.

Alternatively, in some embodiments, the biasing assembly W may include one biasing wire disposed on a side of the bottom plate 10, and a guiding mechanism is correspondingly provided for guiding the movable portion 30, to force the movable portion 30 to move linearly or rotate relative to the bottom plate 10.

Figure 10:
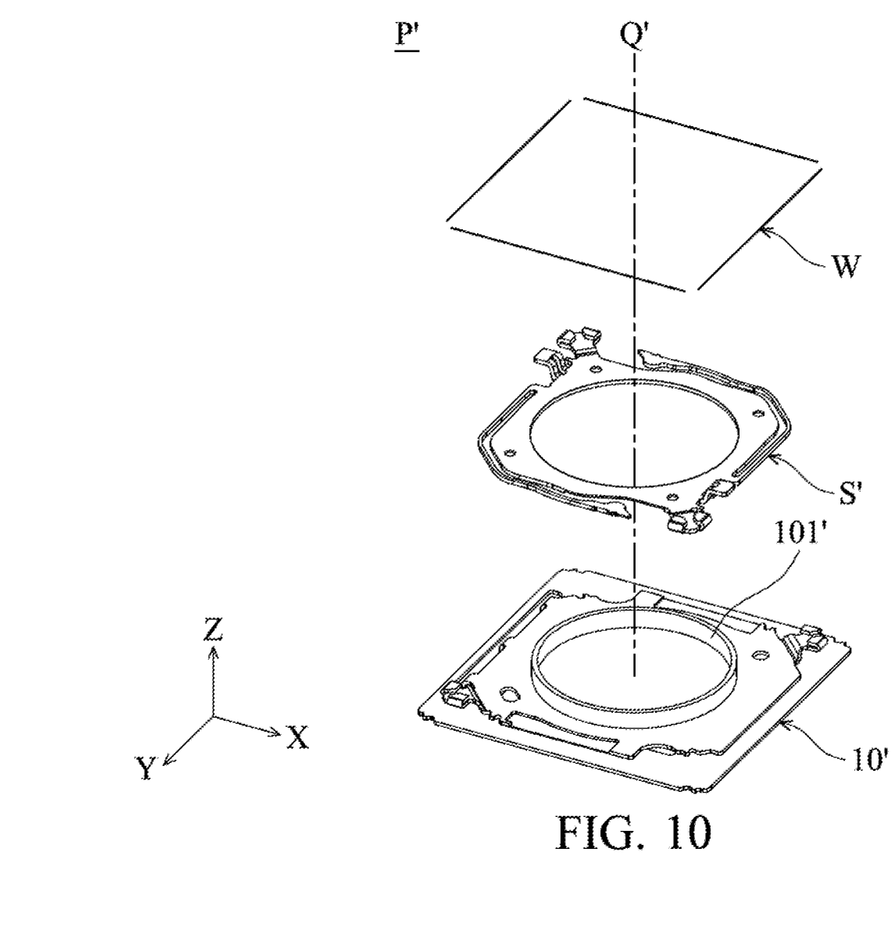
FIG. 10 is an exploded diagram of a first part P' according to another embodiment of the invention.
Figure 11:
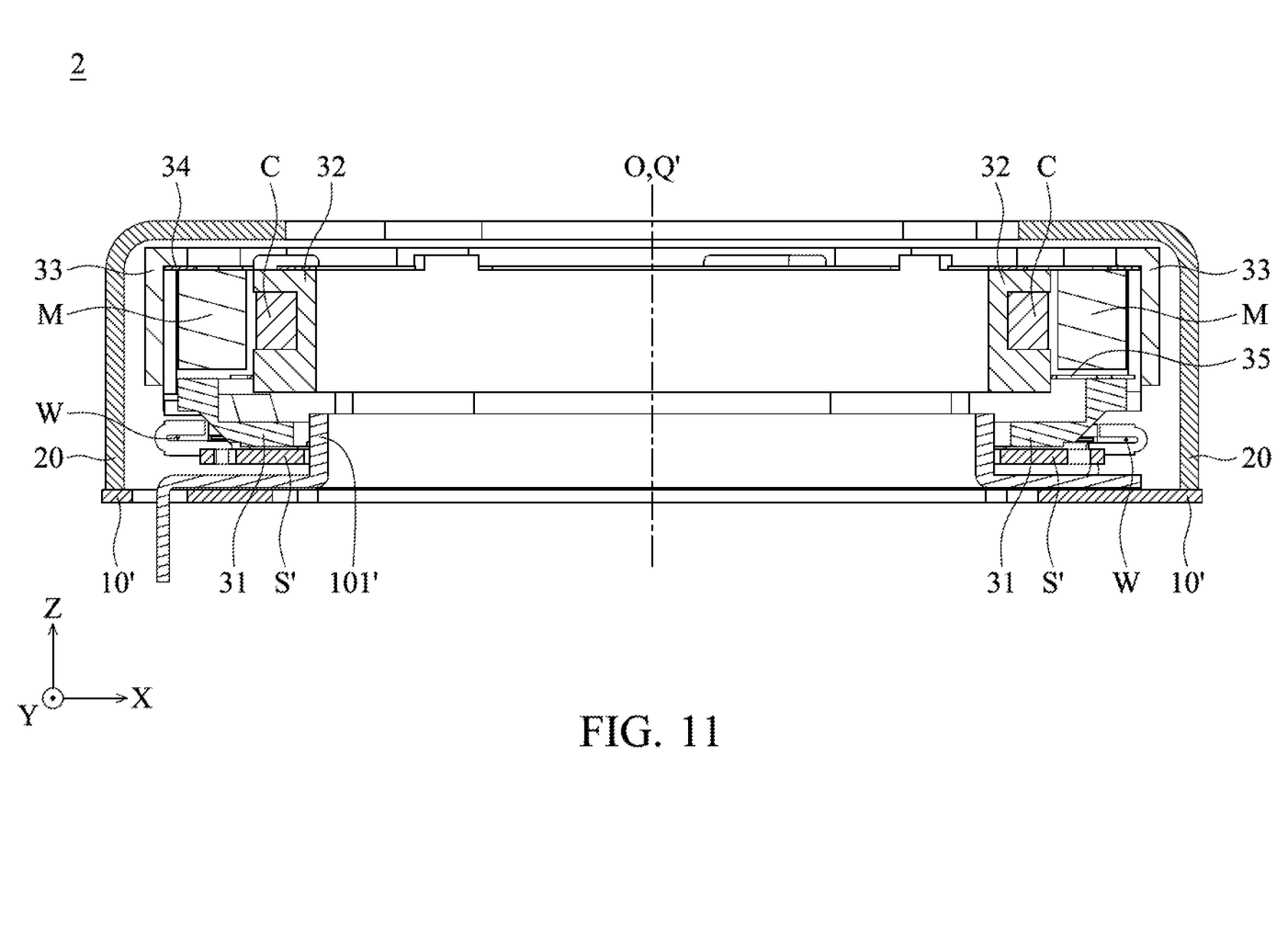
FIG. 11 is a sectional view diagram of a lens driving mechanism according to another embodiment of the invention.

FIGS. 10 and 11 are schematic diagrams of a first portion P' of a lens driving mechanism 2 according to another embodiment of the invention. The main difference between the lens driving mechanism 2 in the present embodiment and the lens driving mechanism 1 in the aforementioned embodiment is that the first portion P' is different from the first portion P. The other components, being the same or similar, are not described again here in detail.

In the present embodiment, as shown in FIG. 10, the bottom plate 10' of the first portion P' has a circular or substantially circular flange structure 101'. The flange structure 101' is formed along the opening edge of the bottom plate 10' 'and extends in the direction of the central axis Q' of the bottom plate 10' to pass through the elastic member S', wherein the elastic member S' does not include the flange structure S4 of the aforementioned embodiment (FIGS. 8-9).

When the first portion P' is assembled to the movable portion 30 and the housing 20, as shown in the sectional view diagram of the lens driving mechanism 2 in FIG. 11, the flange structure 101' and the holder 32 overlap (or are overlapping) in the direction of the optical axis O (or the central axis Q' of the bottom plate 10'), and the flange structure 101' is closer to the optical axis O with respect to the holder 32. By forming the flange structure 101', it is possible to reduce or even prevent dust and other external particles from entering into the holder 32 and affecting the optical lens, thereby improving the quality of the final product.

In summary, a lens driving mechanism is provided, configured to drive an optical lens, primarily including a bottom plate, a movable portion, an elastic member, and a biasing assembly. The movable portion is disposed on the bottom plate and has a base and a holder, wherein the holder is configured to hold the optical lens and movably connects to the base. The elastic member connects the movable portion to the bottom plate. The biasing assembly connects the bottom plate and the movable portion and is configured to force the movable portion to move relative to the bottom plate. When the holder moves to a lower-limit position relative to the base, the holder comes into contact with the elastic member. Furthermore, when the holder moves to an upper-limit position relative to the base, the holder is in contact with a housing of the lens driving mechanism. Therefore, by the holder restricted via the elastic member and the housing, the overall size of the lens driving mechanism can be reduced due to additional restriction/stopping mechanisms for the holder being saved, and the optical driving mechanism has a better focus function and optical shaking compensation due to a larger space being provided for the holder to move, thereby enhancing the image quality.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A lens driving mechanism, configured to drive an optical lens, comprising:
　　a bottom plate;
　　a movable portion, disposed on the plate, including:
　　　　a base; and
　　　　a holder, configured to sustain the optical lens and movably connected to the base;

an elastic member, connecting the bottom plate and the movable portion; and a biasing assembly, connecting the bottom plate and the movable portion and configured to force the movable portion to move relative to the bottom plate;

wherein when the holder moves to a lower-limit position, the holder is in contact with the elastic member;

wherein the lens driving mechanism further comprises a housing connecting to and disposed on the bottom plate, and the movable portion is disposed in the housing, wherein when the movable portion moves to an upper-limit position relative to the base, the holder is in contact with the housing.

2. The lens driving mechanism as claimed in claim 1, wherein the movable portion further includes a frame disposed on the base, and the frame does not overlap with the holder in the direction of an optical axis of the optical lens.

3. The lens driving mechanism as claimed in claim 2, wherein when the holder moves to the upper-limit position, the holder protrudes from the frame.

4. The lens driving mechanism as claimed in claim 2, wherein when the holder moves along the direction of the optical axis in the housing, the holder is not in contact with the base and the frame.

5. The lens driving mechanism as claimed in claim 2, wherein the frame includes a permeable material.

6. The lens driving mechanism as claimed in claim 2, wherein the movable portion further includes an electromagnetic driving assembly disposed on the frame and the holder and configured to force the holder to move relative to the base, and the electromagnetic driving assembly has at least one magnetic element disposed on the frame, wherein the frame exposes the magnetic element in the direction of the optical axis.

7. The lens driving mechanism as claimed in claim 2, wherein the movable portion further includes a first leaf spring having a bending structure and connecting the holder and the frame, and the frame exposes the bending structure in the direction of the optical axis.

8. The lens driving mechanism as claimed in claim 1, wherein the base has a first engaging portion, the elastic member has a second engaging portion, and the first and second engaging portions engage with each other.

9. A lens driving mechanism, configured to drive an optical lens, comprising:
   a bottom plate;
   a movable portion, disposed on the plate, including:
      a base; and
      a holder, configured to sustain the optical lens and movably connected to the base;
   an elastic member, connecting the bottom plate and the movable portion; and
   a biasing assembly, connecting the bottom plate and the movable portion and configured to force the movable portion to move relative to the bottom plate;
   wherein when the holder moves to a lower-limit position, the holder is in contact with the elastic member;
   wherein when the holder moves to the lower-limit position, the holder protrudes from the lower surface of the base.

10. The lens driving mechanism as claimed in claim 9, wherein the elastic member has an opening with a flange structure extending toward the base.

11. The lens driving mechanism as claimed in claim 10, wherein in a direction perpendicular to the optical axis of the optical lens, the flange structure of the elastic member and the holder are overlapping.

12. The lens driving mechanism as claimed in claim 1, wherein the bottom plate has a flange structure passing through the elastic member.

13. The lens driving mechanism as claimed in claim 12, wherein in a direction perpendicular to the optical axis of the optical lens, the flange structure of the bottom and the holder are overlapping.

14. The lens driving mechanism as claimed in claim 1, wherein the biasing assembly forces the movable portion to move along an optical axis of the optical lens or forces the movable portion to rotate around the optical axis.

* * * * *